(12) United States Patent
Hori et al.

(10) Patent No.: US 10,726,539 B2
(45) Date of Patent: Jul. 28, 2020

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Shinjiro Hori, Yokohama (JP); Tetsuya Suwa, Yokohama (JP); Tomokazu Ishikawa, Yokohama (JP); Wakako Tanaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 15/494,635

(22) Filed: Apr. 24, 2017

(65) Prior Publication Data
US 2017/0316558 A1 Nov. 2, 2017

(30) Foreign Application Priority Data

Apr. 27, 2016 (JP) .................................. 2016-089942

(51) Int. Cl.
G06K 9/00 (2006.01)
G06T 7/00 (2017.01)
(Continued)

(52) U.S. Cl.
CPC ............ *G06T 7/001* (2013.01); *G06K 9/4604* (2013.01); *G06T 7/11* (2017.01); *G06T 7/13* (2017.01);
(Continued)

(58) Field of Classification Search
CPC .................................. G06T 7/001; G06T 7/13
See application file for complete search history.

(56) References Cited

U.S. PATENT DOCUMENTS 4,125,858 A * 11/1978 Hounsfield .............. H04N 9/43
348/162
6,496,194 B1 * 12/2002 Mikoshiba ........... G09G 3/2029
345/596
(Continued)

FOREIGN PATENT DOCUMENTS

JP 2013-185862 A 9/2013
JP 2013185862 A * 9/2013 ............. G06T 7/001

OTHER PUBLICATIONS

Aoki, Kimiya et al. "Performance Verification of "KIZUKI" Processing via Real Industrial Parts", Vision Engineering Workshop, OS4-H4 (View 2013), (IS2-A4), The Japan Society for Precision Engineering, 2013.
(Continued)

Primary Examiner — Feng Niu
(74) Attorney, Agent, or Firm — Venable LLP

(57) ABSTRACT

An image processing apparatus having a generation unit configured to generate an aligned image by arranging a plurality of candidate images extracted from a reference image around a work inspection image extracted from an inspection target image; a unit configured to subject the aligned image to similar region extraction processing to represent a similarity between regions in the aligned image; a determination unit configured to select a candidate image and determine it as a work reference image based on the aligned image after being subjected to the similar region extraction processing; and a comparison unit to compare the work inspection image with the work reference image. The similar region extraction processing subjects each of a plurality of division regions obtained by dividing the aligned image based on predetermined division size and phase, to averaging processing, and then adds the results of the
(Continued)

averaging processing that are obtained by varying at least one of the division size and phase.

20 Claims, 13 Drawing Sheets

(51) Int. Cl.
| | |
|---|---|
| *G06T 7/33* | (2017.01) |
| *G06T 7/38* | (2017.01) |
| *G06T 7/11* | (2017.01) |
| *G06T 7/13* | (2017.01) |
| *G06K 9/46* | (2006.01) |
| *H04N 1/60* | (2006.01) |

(52) U.S. Cl.
CPC ............... *G06T 7/337* (2017.01); *G06T 7/38* (2017.01); *H04N 1/6027* (2013.01); *G06T 2207/10016* (2013.01); *G06T 2207/20021* (2013.01); *G06T 2207/30108* (2013.01); *G06T 2207/30164* (2013.01)

(56) References Cited

U.S. PATENT DOCUMENTS

| | | | |
|---|---|---|---|
| 6,504,948 B1* | 1/2003 | Schemmel | G06T 7/001 |
| | | | 382/149 |
| 6,587,593 B1* | 7/2003 | Matsuoka | G06T 5/50 |
| | | | 382/260 |
| 6,608,926 B1 | 8/2003 | Suwa et al. | |
| 6,694,051 B1 | 2/2004 | Yamazoe et al. | |
| 7,031,511 B2 | 4/2006 | Asai | |
| 7,432,985 B2 | 10/2008 | Ishikawa et al. | |
| 7,599,550 B1* | 10/2009 | Kaplinsky | G08B 13/19656 |
| | | | 382/162 |
| 7,616,823 B2 | 11/2009 | Ishikawa | |
| 7,724,951 B2* | 5/2010 | Takayama | G06K 9/40 |
| | | | 382/170 |
| 7,924,469 B2 | 4/2011 | Ono et al. | |
| 7,944,588 B2 | 5/2011 | Yamada et al. | |
| 8,175,155 B2 | 5/2012 | Suwa et al. | |
| 8,237,991 B2 | 8/2012 | Ono et al. | |
| 8,405,876 B2 | 3/2013 | Nakatani et al. | |
| 8,620,105 B2 | 12/2013 | Hori et al. | |
| 9,052,742 B2 | 6/2015 | Hori et al. | |
| 9,088,753 B2 | 7/2015 | Akiba et al. | |
| 9,135,523 B2 | 9/2015 | Kato et al. | |
| 9,189,681 B2 | 11/2015 | Kunieda et al. | |
| 9,232,109 B2 | 1/2016 | Suwa et al. | |
| 9,275,270 B2 | 3/2016 | Suwa et al. | |
| 9,351,014 B2* | 5/2016 | Suzuki | H04N 19/197 |
| 9,386,186 B2 | 7/2016 | Mochizuki et al. | |
| 9,649,839 B2* | 5/2017 | Ishikawa | B41J 2/16579 |
| 9,686,540 B2* | 6/2017 | Zhou | H04N 17/02 |
| 9,944,102 B2* | 4/2018 | Suwa | B41J 29/38 |
| 9,965,842 B2* | 5/2018 | Suwa | G06T 7/0004 |
| 10,013,626 B2* | 7/2018 | Hori | H04N 1/409 |
| 10,063,838 B2* | 8/2018 | Segawa | G06T 1/20 |
| 2003/0223631 A1 | 12/2003 | Ine | |
| 2007/0133863 A1 | 6/2007 | Sakai et al. | |
| 2008/0019580 A1* | 1/2008 | Ohyu | G06K 9/3216 |
| | | | 382/130 |
| 2008/0309602 A1* | 12/2008 | Hwang | G09G 3/006 |
| | | | 345/89 |
| 2010/0124375 A1* | 5/2010 | Wu | G06T 7/11 |
| | | | 382/173 |
| 2012/0268759 A1 | 10/2012 | Ono et al. | |
| 2013/0039420 A1* | 2/2013 | Liu | G06T 7/0002 |
| | | | 375/240.12 |
| 2015/0243000 A1 | 8/2015 | Hori et al. | |
| 2017/0004612 A1* | 1/2017 | Hsu | G06T 7/0004 |
| 2017/0006185 A1* | 1/2017 | Yanai | H04N 1/40 |
| 2017/0309011 A1* | 10/2017 | Hori | G06T 7/001 |

OTHER PUBLICATIONS

Oct. 4, 2017 European Search Report in European Patent Appln. No. 17000596.1.

Kimiya Aoki, et al., "'KIZUKI' Processing for Visual Inspection: A Smart Pattern Pop-out Algorithm based on Human Visual Architecture," International Conference on Pattern Recognition, IEEE Computer Society, Aug. 24, 2014, pp. 2317-2322.

\* cited by examiner

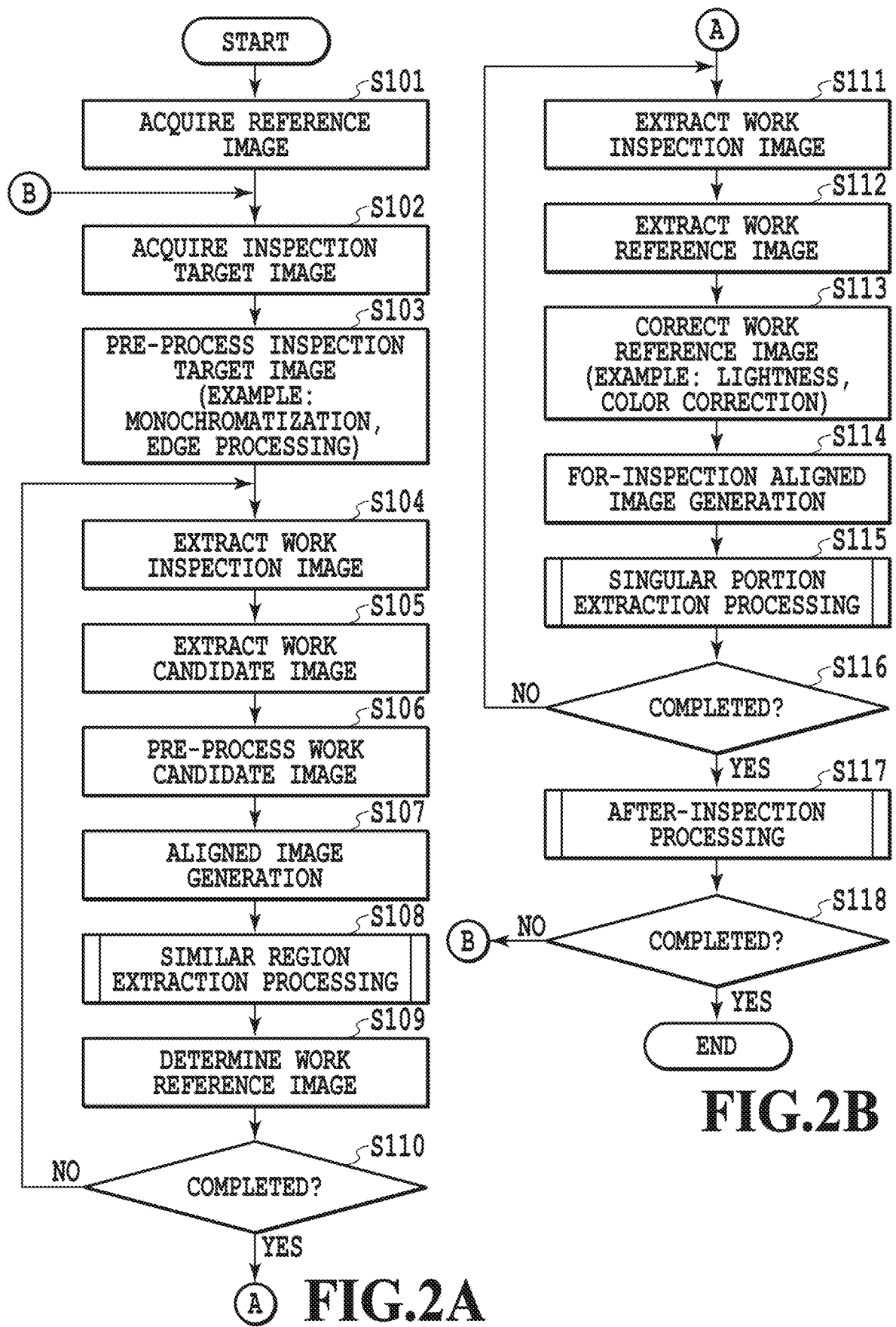

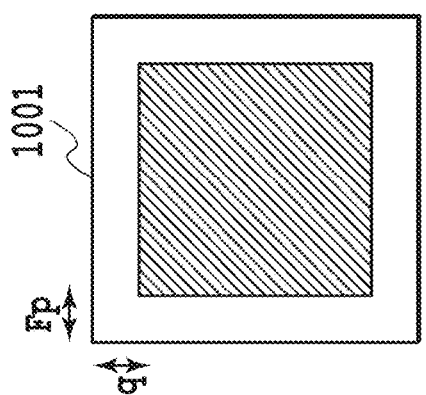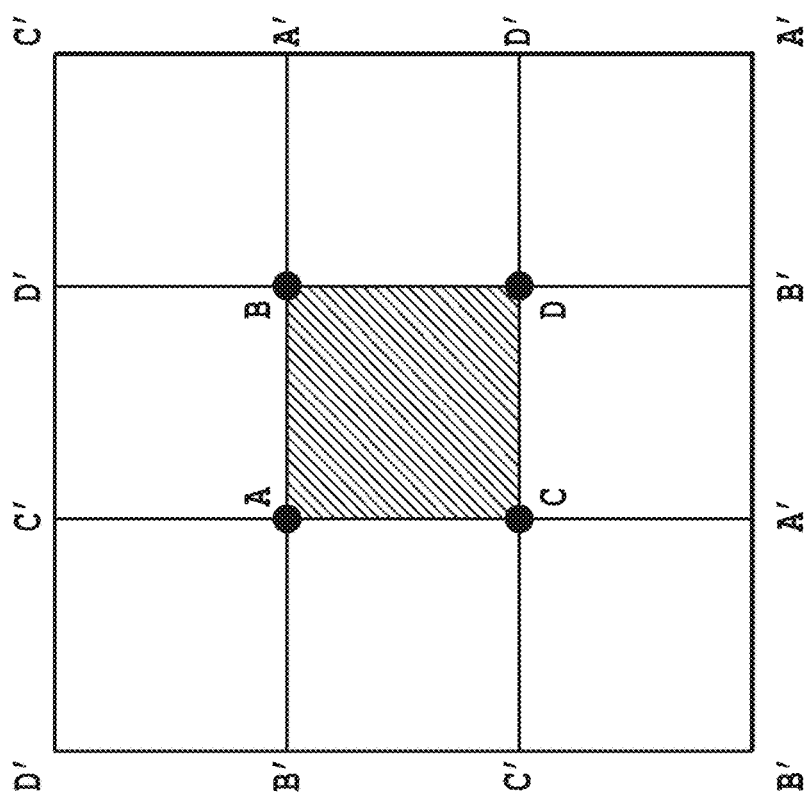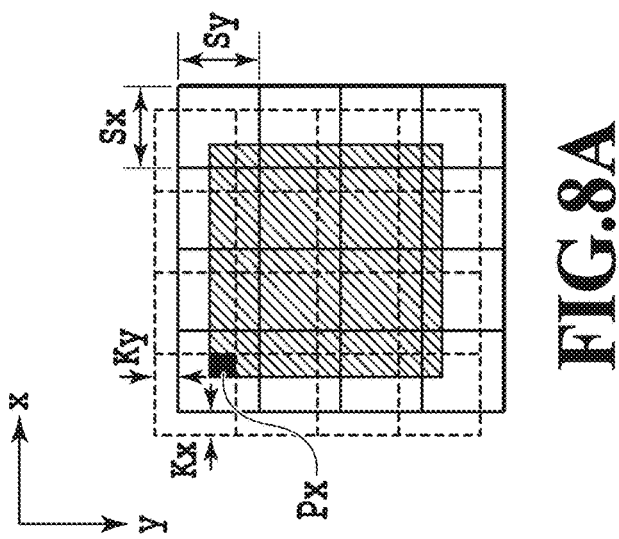

IMAGE PROCESSING APPARATUS, IMAGE PROCESSING METHOD AND STORAGE MEDIUM

BACKGROUND OF THE INVENTION

Field of the Invention

The present invention relates to an image processing apparatus and an image processing method to compare an inspection target image with a reference image.

Description of the Related Art

Japanese Patent Laid-Open No. 2013-185862 discloses an algorithm to detect a defect of an inspection object based on a human visual mechanism. The processing disclosed in Japanese Patent Laid-Open No. 2013-185862 will be herein referred to as a processing of peripheral vision and involuntary eye movement during fixation. The use of the processing of peripheral vision and involuntary eye movement during fixation provides the effective extraction or exposure of the defect of the inspection object without the human gaze.

On the other hand, "Performance Verification of "KIZUKI" Processing via Real Industrial Parts" Vision Engineering Workshop (ViEW2013), OS4-H4(IS2-A4), The Japan Society For Precision Engineering (2013) (hereinafter referred to as the above Nonpatent Document) discloses a method by which, in order to detect a defective product from a plurality of objects, inspection target regions are image-taken with regard to each of the plurality of objects to connect the resultant images to generate an aligned image and the aligned image is subjected to the above processing of peripheral vision and involuntary eye movement during fixation. The use of the above Nonpatent Document can provide the extraction of an object having a singular portion (defect) different from those of a plurality of objects in a relatively-simple manner.

However, in a case where a plurality of objects continuously carried in a manufacture line are sequentially inspected using a fixed camera, image-taking regions by the camera are inevitably displaced at some level for the respective objects. If Japanese Patent Laid-Open No. 2013-185862 is used while the displacement as described above is left, then both of a flaw actually existing in the objects and the displacement between images as described above cause, in the processing of peripheral vision and involuntary eye movement during fixation, a singular portion to be extracted, consequently disadvantageously causing a case where the inspection accuracy is lowered.

SUMMARY OF THE INVENTION

The present invention has been made in order to solve the above disadvantage. Thus, it is an objective of the invention to provide an image processing apparatus to suppress the influence by the displacement of image regions obtained by image-taking objects so that the objects can be inspected accurately.

According to a first aspect of the present invention, there is provided an image processing apparatus, comprising: a generation unit configured to generate an aligned image by arranging a plurality of candidate images extracted from a reference image around a work inspection image extracted from an inspection target image; a unit of configured to subject the aligned image to similar region extraction processing to represent a similarity between regions in the aligned image; a determination unit configured to select a candidate image and determine it as a work reference image based on the aligned image after being subjected to the similar region extraction processing; and a comparison unit to compare the work inspection image with the work reference image, wherein the similar region extraction processing subjects each of a plurality of division regions obtained by dividing the aligned image based on predetermined division size and phase, to averaging processing, and then adds the results of the averaging processing that are obtained by varying at least one of the division size and phase.

According to a second aspect of the present invention, there is provided an image processing method, comprising: a generation step of generating an aligned image by arranging a plurality of candidate images extracted from a reference image around a work inspection image extracted from an inspection target image; a step of subjecting the aligned image to similar region extraction processing to represent a similarity between regions in the aligned image; a determination step of selecting a candidate image and determining it as a work reference image based on the aligned image after being subjected to the similar region extraction processing; and a comparison step of comparing the work inspection image with the work reference image, wherein the similar region extraction processing subjects each of a plurality of division regions obtained by dividing the aligned image based on predetermined division size and phase, to averaging processing, and then adds the results of the averaging processing that are obtained by varying at least one of the division size and phase.

According to a third aspect of the present invention, there is provided a non-transitory computer-readable storage medium which stores a program for causing an image processing method to be executed by a computer, the image processing method comprising: a generation step of generating an aligned image by arranging a plurality of candidate images extracted from a reference image around a work inspection image extracted from an inspection target image; a step of subjecting the aligned image to similar region extraction processing to represent a similarity between regions in the aligned image; a determination step of selecting a candidate image and determining it as a work reference image based on the aligned image after being subjected to the similar region extraction processing; and a comparison step of comparing the work inspection image with the work reference image, wherein the similar region extraction processing subjects each of a plurality of division regions obtained by dividing the aligned image based on predetermined division size and phase, to averaging processing, and then adds the results of the averaging processing that are obtained by varying at least one of the division size and phase.

Further features of the present invention will become apparent from the following description of exemplary embodiments with reference to the attached drawings.

BRIEF DESCRIPTION OF THE DRAWINGS

FIGS. 2A and 2B are a flowchart of a singular portion detection algorithm;

FIGS. 8A to 8C are a diagram to explain an expansion processing;

DESCRIPTION OF THE EMBODIMENTS

Figure 1:
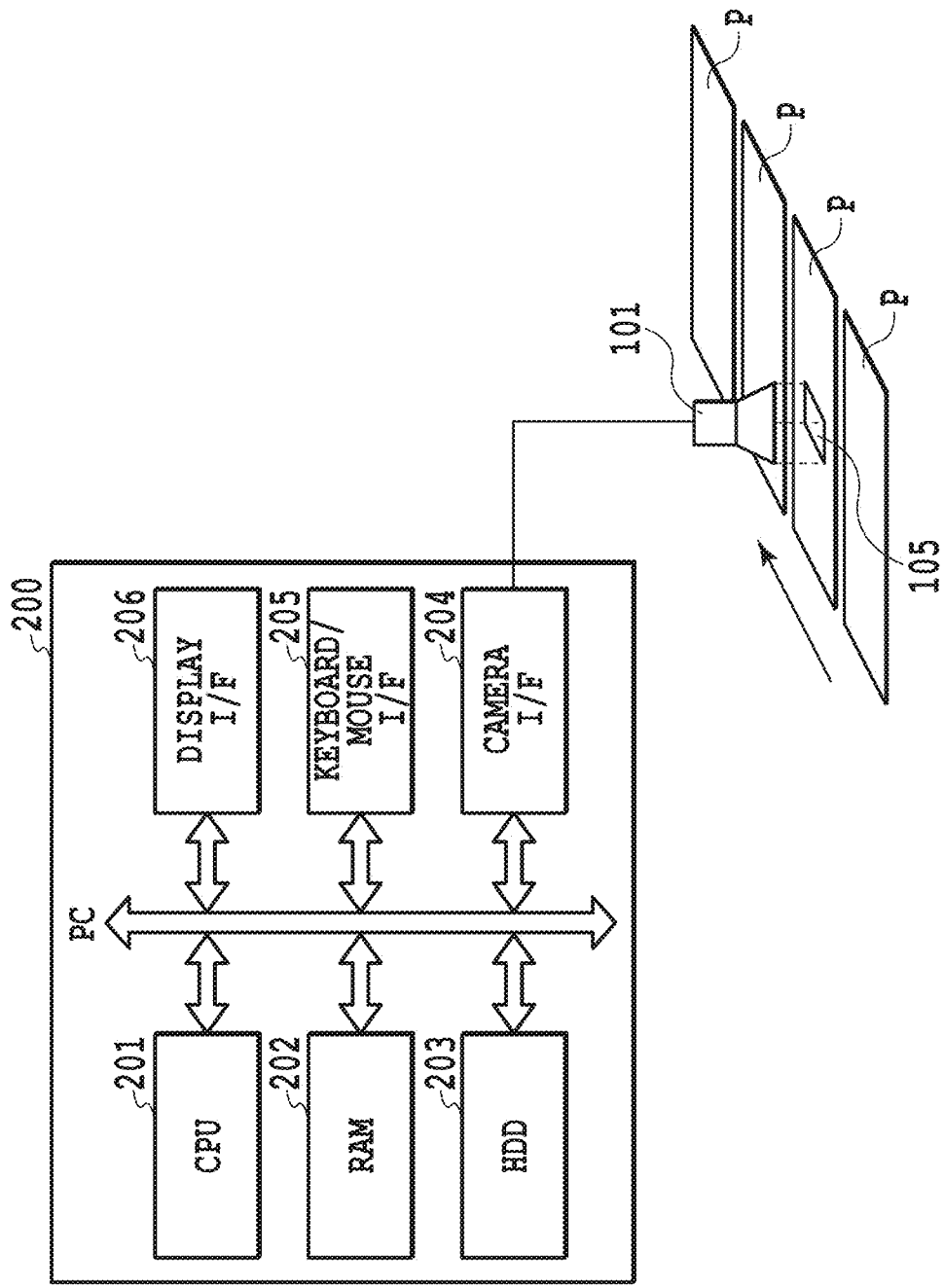
FIG. 1 is a diagrammatic illustration of an inspection system that can be used in the present invention.

FIG. 1 is a diagrammatic illustration of an inspection system that can be used in the present invention. This system is mainly composed of an image processing apparatus 200, a plurality of sheet-like inspection objects P, and a camera 101 to image-take the predetermined position of an individual object P. The plurality of objects P are carried at a fixed speed in the arrow direction. The image processing apparatus 200 extracts a defect (singular portion) of an object P based on an image obtained by image-taking the object P.

A CPU 201 controls the entire system while using a RAM 202 as a work area based on a program retained in an HDD 203. For example, the CPU 201 controls the camera 101 connected via a camera I/F (interface) 204 to image-take the respective carried objects P to obtain images corresponding to the respective objects P. During this, the CPU 201 repeats image-taking operations at a timing at which an inspection target region 105 of the individual the object P is placed in the image-taking region of the camera 101 and a cycle depending on the carrying speed to thereby store the resultant image in the RAM 202 sequentially. In a case where a carrying error for example causes an image-taking region to be displaced from the individual inspection target region 105, a pattern functioning as reference point for example may be printed on the object P in advance so that an image-taking operation is set at a timing at which the pattern is detected as a reference. The camera 101 can be connected to the camera I/F by a CameraLink, USB, IEEE1394, or LAN for example. Although the shown configuration uses the camera 101, the camera 101 can be substituted with a scanner including a line sensor. In the shown case, a region that can be image-taken by one image-taking operation by the camera 101 is similar to the inspection target region 105 of the sheet P. However, when a region that can be taken in one shot is smaller than the inspection target region 105, then one sheet P may be subjected to a plurality of image-taking operations to connect the resultant images.

A keyboard/mouse I/F 205 is an I/F to control an HID (Human Interface Device) such as a not-shown keyboard or mouse. An operator can input inspection-related information via the information keyboard/mouse I/F 205. A display I/F 206 is an I/F that controls the display on a not-shown display. The operator can confirm the inspection status or result for example via the display I/F 206.

FIGS. 2A and 2B are a flowchart to explain the singular portion detection algorithm of this embodiment executed by the CPU 201. This processing is composed of the first processing to adjust the position of an image-taken image and the second processing to use the position-adjusted image to perform the singular portion detection processing. The following section will describe them sequentially, FIG. 2A is a flowchart illustrating the first processing. When this processing is started, the CPU 201 in Step S101 acquires a reference image 301. The reference image 301 is an image that is compared with an inspection target image to thereby determine whether or not the inspection target image includes therein a singular portion. The reference image 301 is composed of a plurality of pixels having RGB signal values and is stored in a ROM for example in the form of PDF for example.

In Step S102, the CPU 201 acquires an inspection target image 302. Specifically, an inspection target region 105 of the object P as an inspection target is image-taken by a camera 101 to set the resultant image as an inspection target image 302. The inspection target image 302 of the embodiment is composed of a plurality of pixels having brightness signals of 256 gradations consisting of 3 components of red R, green G, and blue B.

Next, in Step S103, the CPU 201 subjects the inspection target image 302 to a pre-processing. Specifically, the RGB signal is subjected to monochrome conversion processing for the conversion to monochrome brightness signals or edge extraction processing. The monochrome conversion processing can use the following formula for example.

$$I = 0.3 \times R + 0.6 \times G + 0.1 \times B$$

The edge extraction processing can use a Sobel filter or a Laplacian filter for example.

In Step S104, the CPU 201 extracts from, based on a predetermined work image size, the inspection target image 302 corrected in Step S103 to thereby obtain a work inspection image 303. In Step S105, the reference image 301 acquired in Step S101 is extracted from based on the predetermined work image size to thereby obtain a work candidate image 304. During this, a plurality of the work candidate images 304 are extracted from the reference image 301.

Figure 3B:
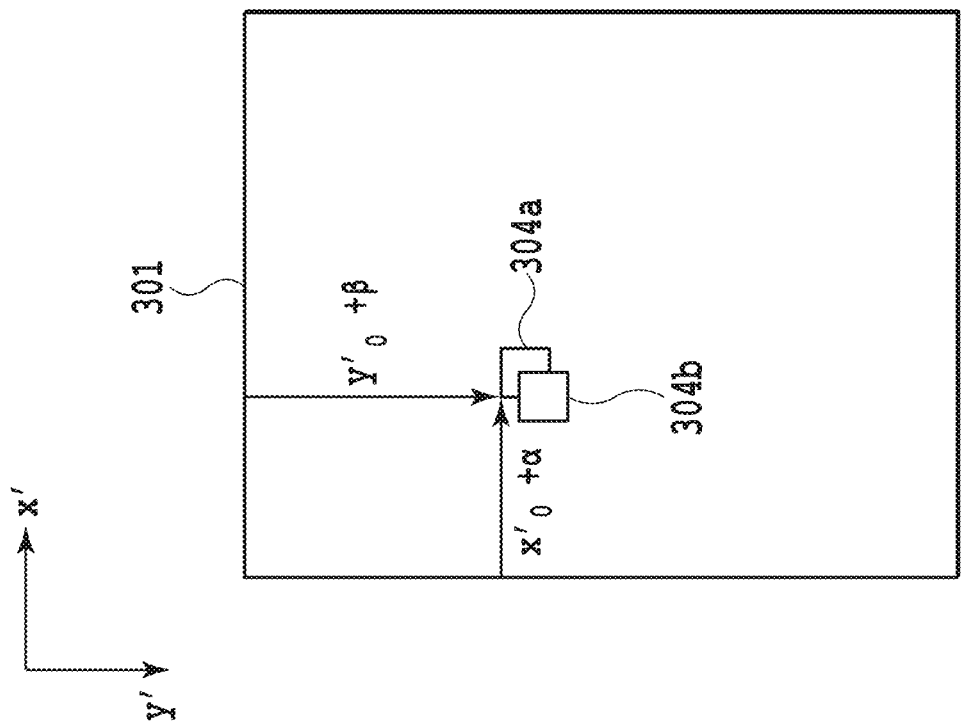
FIGS. 3A and 3B illustrate a work inspection image and the extraction of a work candidate image.
Figure 3A:
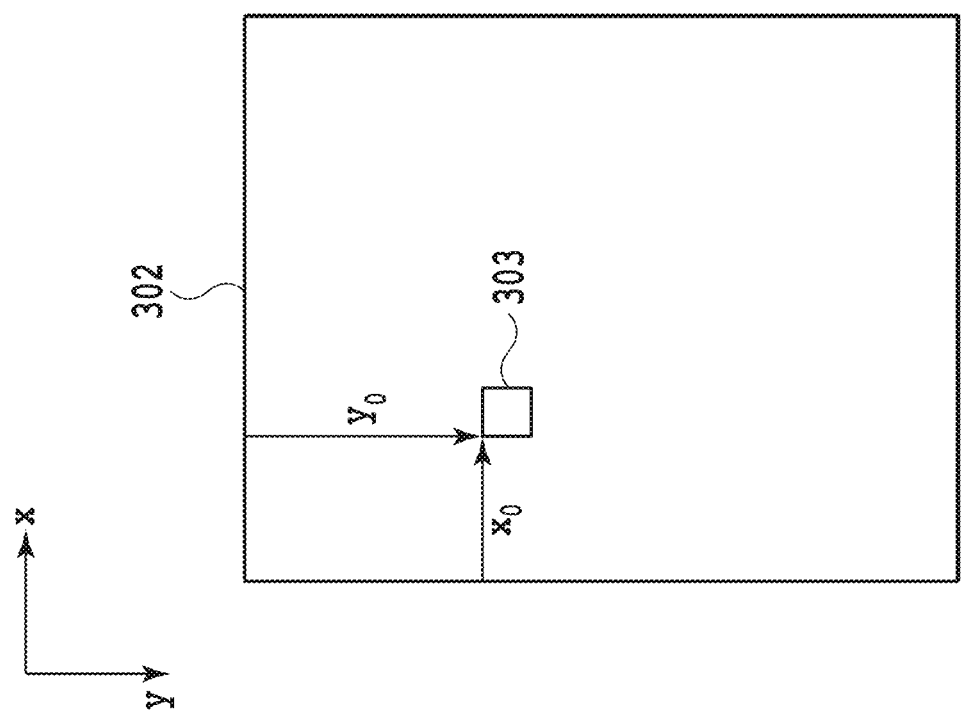

FIGS. 3A and 3B show the extraction of the work inspection image 303 and the work candidate image 304. FIG. 3A shows the extraction of the work inspection image 303 from the coordinate (x0, y0) of the inspection target image 302. On the other hand, FIG. 3B shows the extraction of a plurality of the work candidate images 304 from the reference image 301 based on the coordinate (x0, y0) of the extracted work inspection image 303 as a reference. In this example, a plurality of images having the same size as that of the work inspection image 303 are extracted from positions shifted by a predetermined amount from the coordinate (x0, y0) of the reference image 301 as a center and these are set as the work candidate images. Specifically, the coordinate of the work candidate image can be represented as (x0+α, y0+β) using variables α and β. Although the two work candidate images 304a and 304b are shown in FIG. 3B, Step S105 extracts work candidate images from 8 positions including (x0, y0).

Next, in Step S106, the respective plurality of work candidate images are subjected to the pre-processing as in Step S103. This consequently prepares one work inspection image 303 composed of monochrome brightness signals and eight work candidate images 304a to 304h having the same size as that of the work inspection image 303 and being composed of a monochrome brightness signals similar to the inspection image 303. In Step S107, the CPU 201 causes the work inspection image 303 to be aligned with the work candidate images 304a to 304h to thereby generate an aligned image 401.

Figure 4:
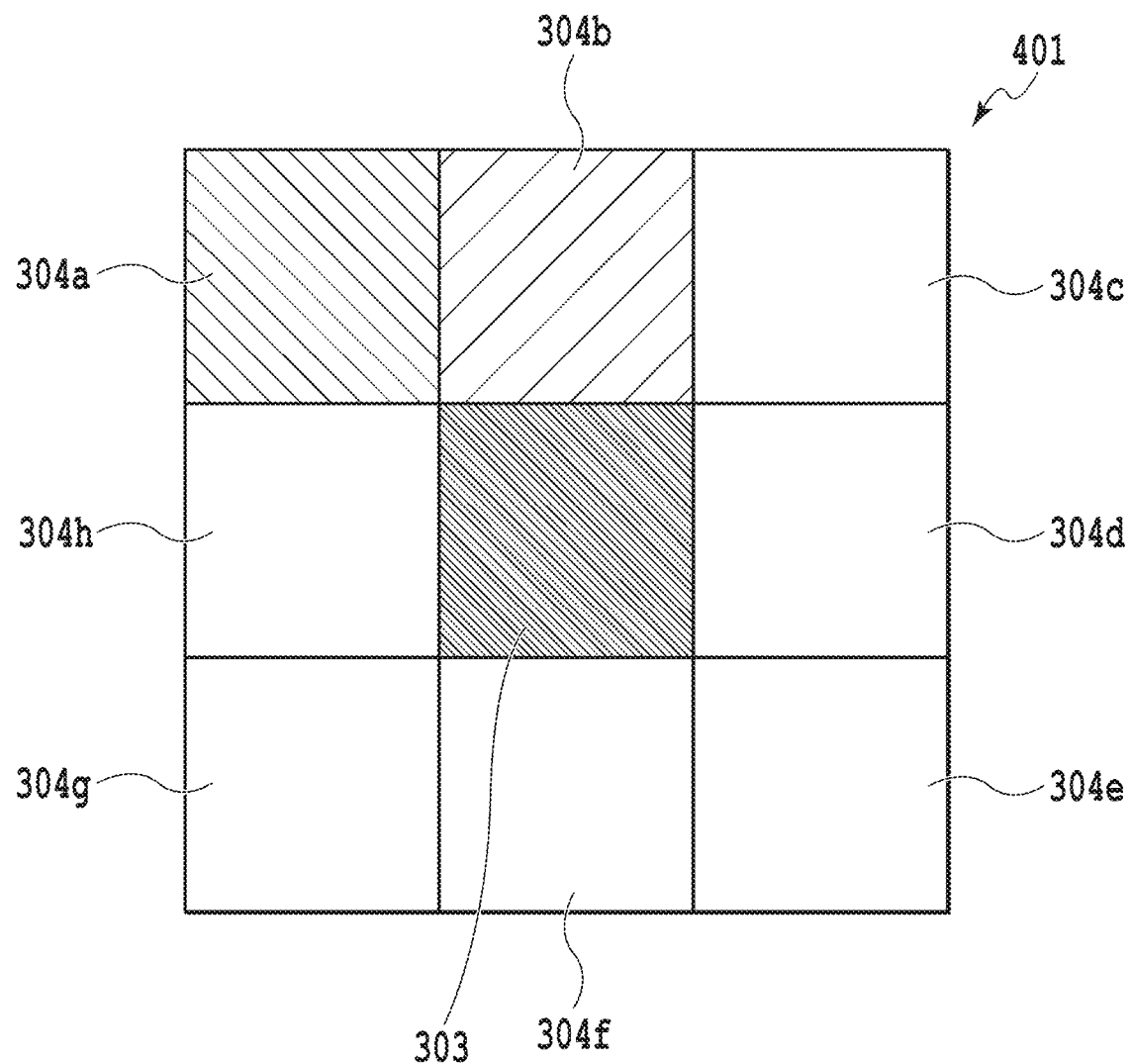
FIG. 4 illustrates an aligned status of aligned images.

FIG. 4 shows the aligned status of the aligned image 401. The aligned image 401 is configured so that one work inspection image 303 is surrounded by the eight work candidate images 304a to 304h for 8 directions that are abutted to one another. The positions at which eight work candidate images 304a to 304h are provided in the aligned image 401 are not particularly limited so long as the position (coordinate) in the reference image 301 corresponds to the position in the aligned image 401 for each of the work candidate images 304a to 304h.

In Step S108, the CPU 201 subjects the aligned image 401 generated in Step S106 to the similar region extraction processing using a processing of peripheral vision and involuntary eye movement during fixation. The detailed method of this processing will be described in detail later.

In Step S109, a work reference image 305 is determined based on the result image of the similar region extraction processing of Step S108. Specifically, the image subjected to the similar region extraction processing of Step S108 is inspected to select, from among the eight work candidate images arranged in Step S107, one image closest to the work inspection image to determine this as the work reference image 305.

In Step S110, it is determined whether or not the inspection target image 302 acquired in Step S102 still includes therein a region from which a work inspection image should be extracted. In a case where the inspection target image 302 acquired in Step S102 still includes therein such a region, then the processing returns to Step S104 to extract the next work inspection image. In a case where the inspection target image 302 acquired in Step S102 does not include therein such a region on the other hand, then the processing proceeds to the second processing.

Figure 5:
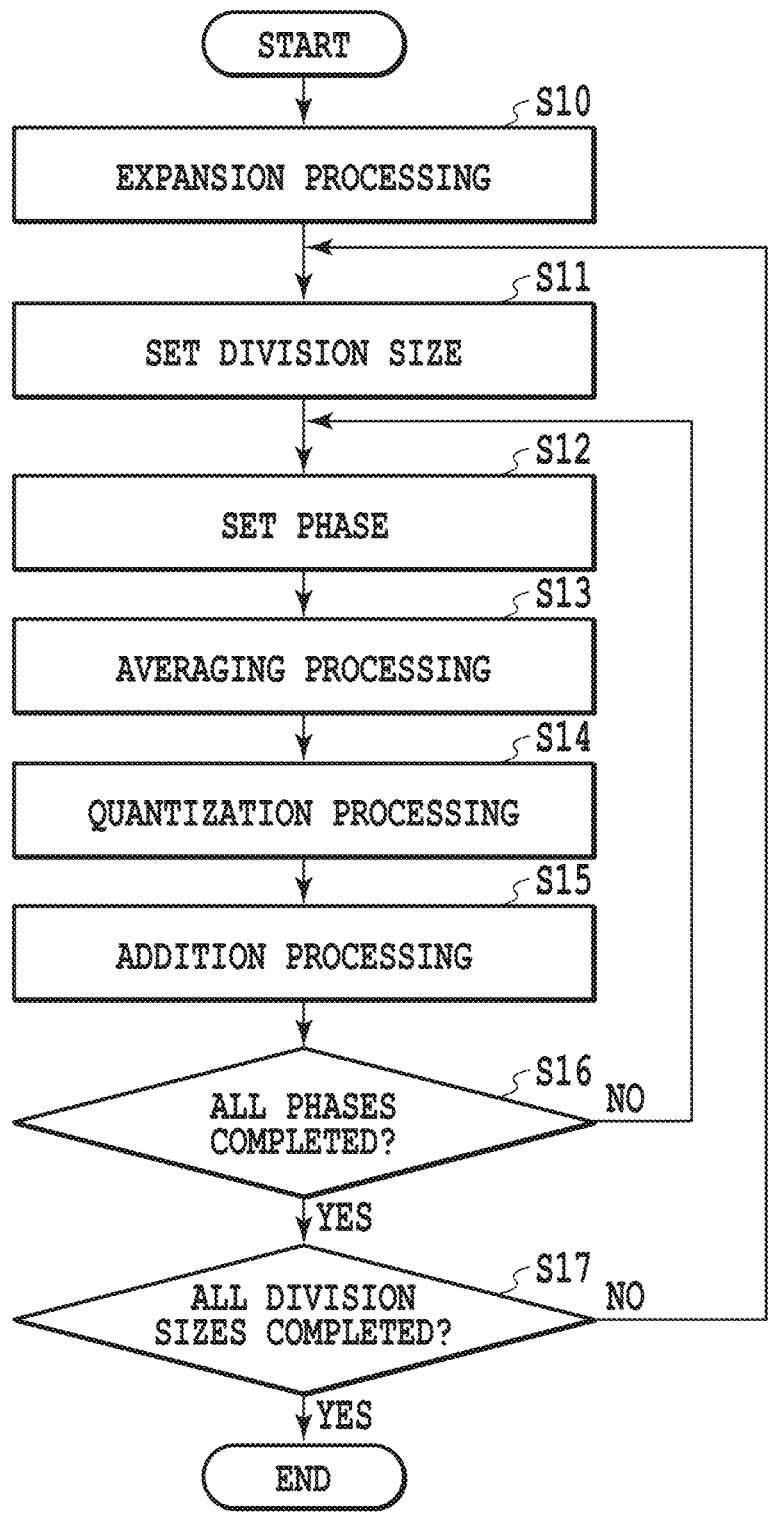
FIG. 5 is a flowchart for explaining the details of similar region extraction processing.

FIG. 5 is a flowchart for explaining the details of the similar region extraction processing executed in S108. When this processing is started, the CPU 201 in Step S10 firstly subjects the aligned image 401 generated in Step S107 to an expansion processing so that the entire area of the aligned image 401 can be correctly subjected to the processing of peripheral vision and involuntary eye movement during fixation, thereby generating the processing target image 1001. The expansion processing will be described in detail later.

Next, in Step S11, the CPU 201 sets one division size from among a plurality of division sizes prepared in advance. In Step S12, one phase is set from among a plurality of phases prepared in advance to correspond to the division sizes set in Step S11. The plurality of division sizes and the plurality of phases corresponding to the plurality of division sizes are prepared in advance based on a size of the work inspection image extracted in Step S104. In the case of this embodiment, due to the characteristic of the processing, the division size is set to a size similar to the work image size or a size larger or smaller by 10% than the work image size.

Figure 6A:
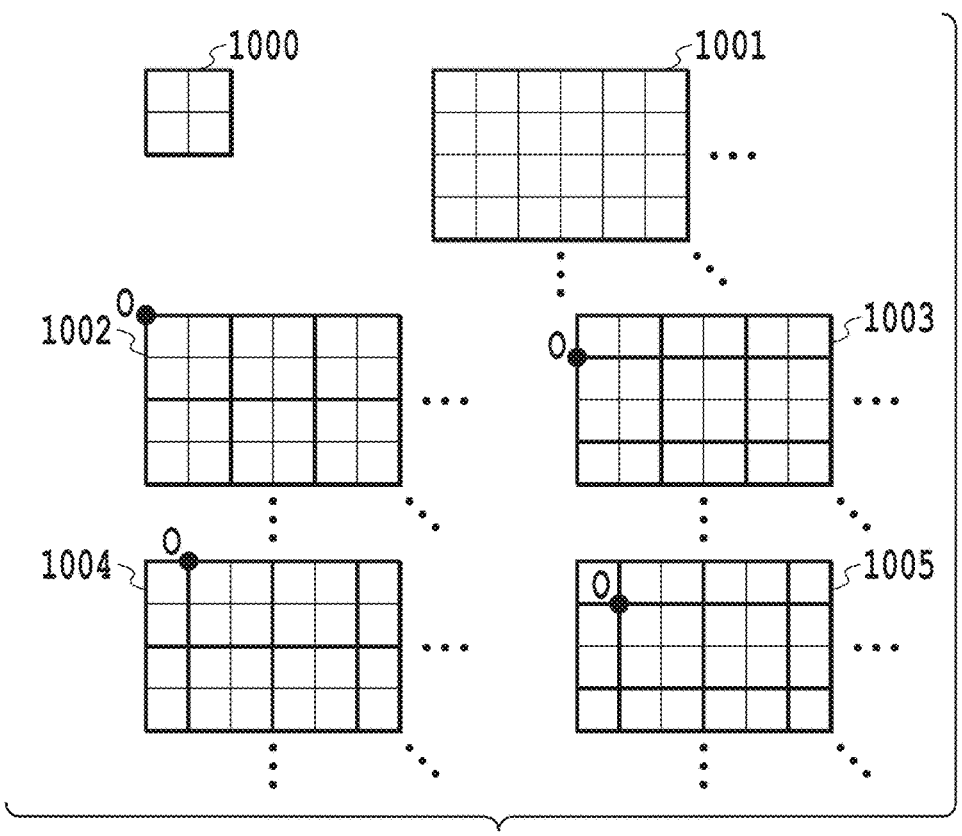
FIGS. 6A and 6B illustrate a division example of a processing target image.
Figure 6B:
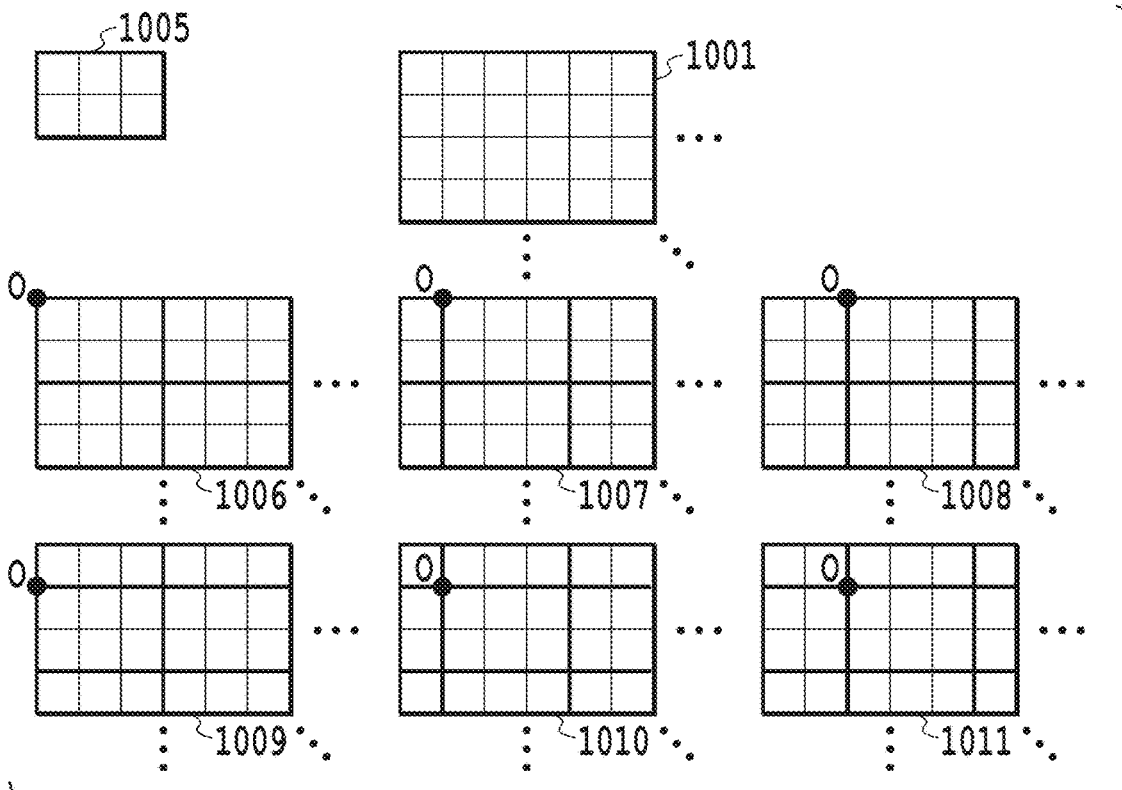
Figure 7A:
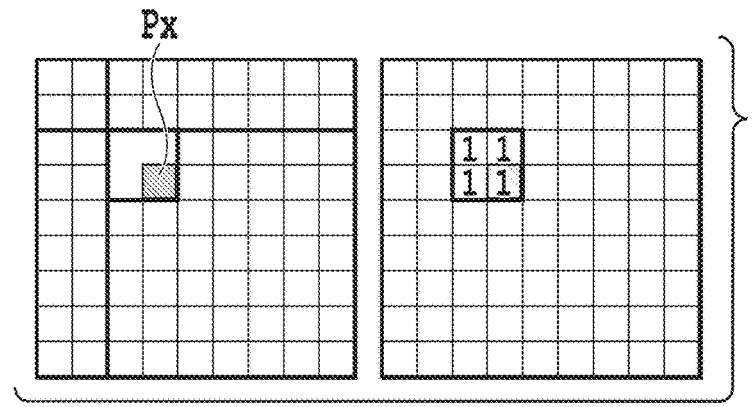
FIGS. 7A to 7E schematically illustrate a process of an addition processing.
Figure 7B:
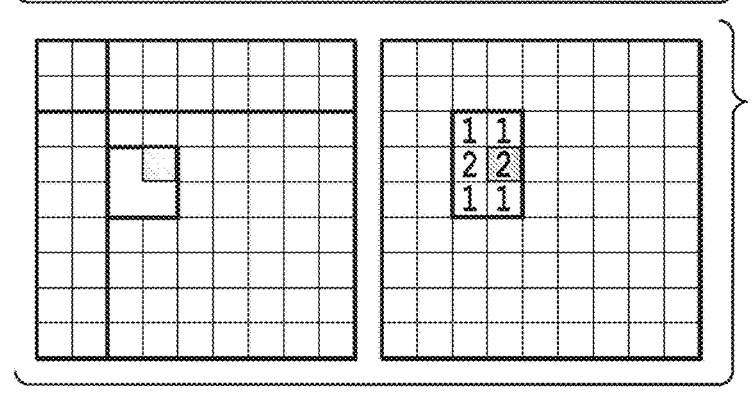
Figure 7C:
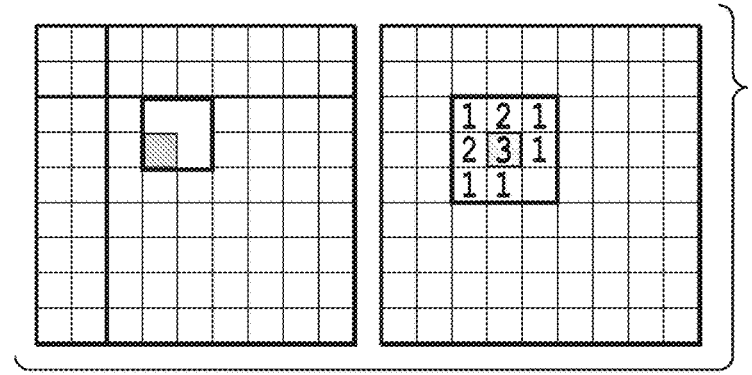
Figure 7D:
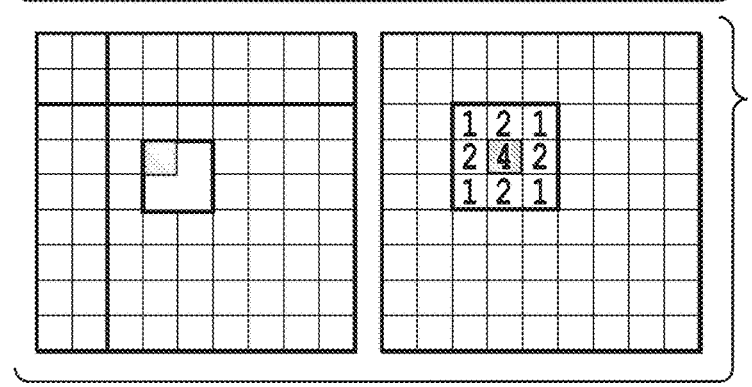
Figure 7E:
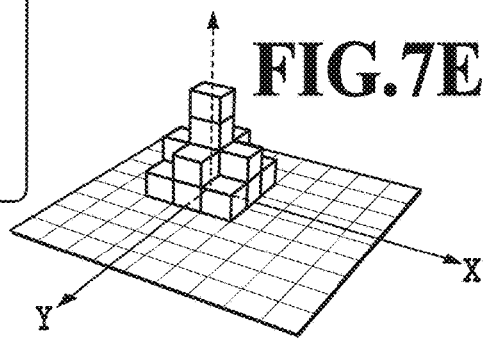

FIGS. 6A and 6B illustrate the division example of a processing target image 1001 based on the division size and phases. FIG. 6A shows a case where the division size is 2×2 pixels and FIG. 6B shows a case where the division size is 3×2 pixels, respectively. In a case where the division size 1000 is 2×2 pixels as shown in FIG. 6A, the processing target image 1001 is divided based on 2×2 pixels as a unit and can be divided in four ways as shown in 1002 to 1005. In a case where the division size 1005 is set to 3×2 pixels as shown in FIG. 6B, the processing target image 1001 can be divided in six ways as shown in 1006 to 1011 having six phases. Generally, in the case of a division region having Sx pixels in the X direction and Sy pixels in the Y direction, the phase number is Sx×Sy. In the processing of peripheral vision and involuntary eye movement during fixation, for each of the division regions, averaging, quantizing, and adding are performed while sequentially changing the phase.

Returning to FIG. 5, in Step S13, based on the division size set in Step S11 and the phase set in Step S12, the processing target image 1001 generated in Step S10 is divided as shown in FIGS. 6A and 6B and each division region is subjected to an averaging processing. Specifically, the average value of the monochrome brightness signals I' owned by the individual pixels is calculated for a plurality of pixels included in each divided region.

In Step S14, the average value of the respective division regions calculated in Step S13 is quantized for each pixel. Specifically, the median value of the brightness of the entire processing target image 1001 is used as a threshold value. The threshold value is compared with the individual average value to output a value of 1 or 0. Although the binarization processing is used in this embodiment, a quantization processing such as ternarization or more also can be used.

In Step S15, the quantization value obtained in Step S14 is added to an addition image data. The addition image data is image data showing the result of adding quantization values of the case where the division sizes and the phase are varied, respectively and having an initial value of 0. When the quantization value obtained in Step S14 has the first phase of the first division size, then the addition image data obtained in Step S15 is equal to the quantization data obtained in Step S14.

Next, in Step S16, the CPU 201 determines whether all phases for the currently-set division size are completely subjected to the processing or not. If it is determined that there is still a phase to be processed, then the processing returns to Step S12 to set the next phase. If it is determined that all phases are completely processed on the other hand, then the processing proceeds to S17.

FIGS. 7A to 7E shows a process of sequentially subjecting, in a case where the division size set in Step S11 is 2×2 pixels shown in FIG. 6A, to the addition processing of Step S15 for all phases. In a case where the division size is 2×2 pixels, there are four phases as described in FIG. 6A. The numbers shown in FIGS. 7A to 7D show, in the process of sequentially changing these four phases, the addition number for using binary data of the peripheral pixels for the addition processing of the target pixel Px. As shown in FIGS. 7A to 7E, since the target pixel Px itself is used for all phases included in the division region, the target pixel Px has the highest addition number, thus having the highest contribution to the addition result. A pixel farther away from the target pixel Px has a lower addition number, thus having smaller contribution to the addition result.

Returning to the flowchart of FIG. 5, in Step S17, the CPU 201 determines whether all of division sizes prepared in advance are completely processed or not. If it is determined that there is still a division size to be processed, then the processing returns to Step S11 to set the next division size. If it is determined that all of the division sizes are completely processed on the other hand, then this processing is completed and returns to the flowchart of FIG. 2A.

The following section will describe the expansion processing executed in Step S10. As described in FIGS. 7A to 7E, in the processing of peripheral vision and involuntary eye movement during fixation of this embodiment, the addition data is calculated based on the average value of all pixels included in a division region moving around the target pixel Px as a center. Thus, with regard to a target pixel positioned at an end of the processing target image 1001, a division region includes a region not including data, which undesirably prevents a correct processing.

However, in Step S109 of this embodiment, the result of the processing of the work inspection image 303 may be compared with the result of the processing of the work candidate images 304 surrounding the work inspection image 303. In order to realize this, the processing of peripheral vision and involuntary eye movement during fixation of Steps S12 to S17 should be correctly carried out on the entire area of the aligned image 401. Specifically, in the expansion processing S10 of this embodiment, the aligned image 401 is further added with a region required for correctly subjecting the entire area of the aligned image 401 to the processing of peripheral vision and involuntary eye movement during fixation.

FIGS. 8A to 8C illustrate the expansion processing performed in Step 10. In the drawings, a region corresponding to the aligned image 401 is shown by the diagonal lines. As shown in FIG. 8A, in a case where the target pixel Px is positioned at a corner of the inspection target region, then a division region around the target pixel Px as a center (solid line) and a division region having a phase dislocated therefrom (dotted line) undesirably include a region not including data (white region). To solve this, in the expansion processing of Step S10, dummy data is added around the pixel Px positioned at the corner so that even in a case the pixel Px in a division region having the maximum division size and the maximum phase, the region can include reasonable data.

FIG. 8B illustrates a method of generating the dummy data. Four images are generated by inverting the aligned image in a point-symmetric manner with respect to the respective vertexes A, B, C, and D and four images are generated by inverting the aligned image in a line-symmetric manner with respect to the respective sides AB, BC, CD, and DA. These eight images surround the aligned image. In this embodiment, a region surrounded by A', B', C', and D' thus prepared also can be used as the processing target image 1001. From the viewpoint of the load reduction however, the processing target image preferably has a smaller size. For example, when assuming that the maximum division size in the processing of peripheral vision and involuntary eye movement during fixation is (Sx, Sy) and the maximum travel distance is (Kx, Ky), such dummy data should be sufficient that is generated to have a size expanded to Fp=(Sx/2)+Kx in the X direction and to Fq=(Sy/2)+Ky in the Y direction. FIG. 8C shows the processing target image 1001 to which the dummy data is added in the manner as described above.

Figure 9B:
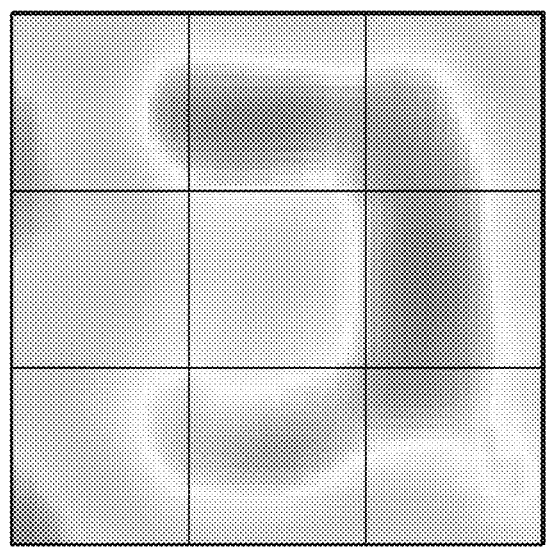
FIGS. 9A and 9B show an aligned image and the result of performing similar region extraction processing.
Figure 9A:
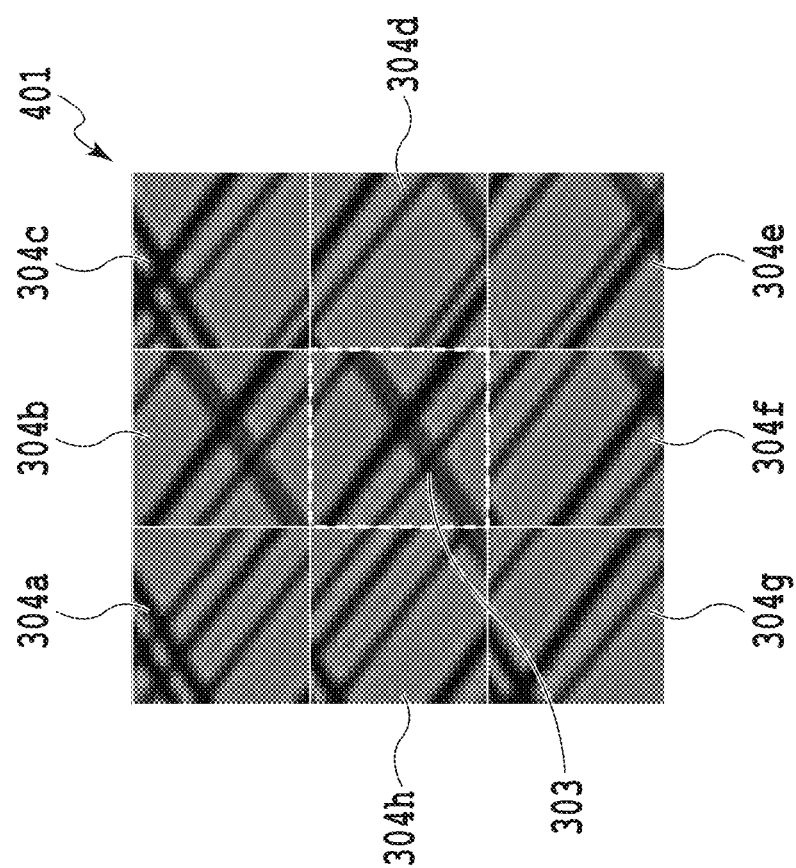

FIGS. 9A and 9B specifically show the processing in a case where the first processing described in FIG. 2A is executed. FIG. 9A shows one example of the aligned image 401 generated in Step S107. FIG. 9B shows the image obtained by subjecting this aligned image 401 to the similar region extraction processing in Step S108.

In the aligned image 401 shown in FIG. 9A the work inspection image 303 is surrounded by a plurality of the work candidate images 304a to 304h. Here, a state is shown where the work candidate image 304b provided just above the work inspection image 303 is most similar to the work inspection image 303. Subjecting such an image to the similar region extraction processing in Step S108 provides the result as shown in FIG. 9B. In the case of this processing, higher lightness (higher brightness) expresses that an image of an individual work region is similar to an image of a work inspection region (or has the same feature). In the aligned image 401 of FIG. 9A, the center portion including the work inspection image 303 has the highest and uniform lightness and a position including the work candidate image 304b has the next highest and uniform lightness. In Step S109, the CPU 201 closely examines such an image result expressing similarity among regions in aligned image 401 to select, from among the work candidate images 304a to 304h, the work candidate image 304b most similar to the work inspection image 303 to set this as the work reference image 305.

Figure 10:
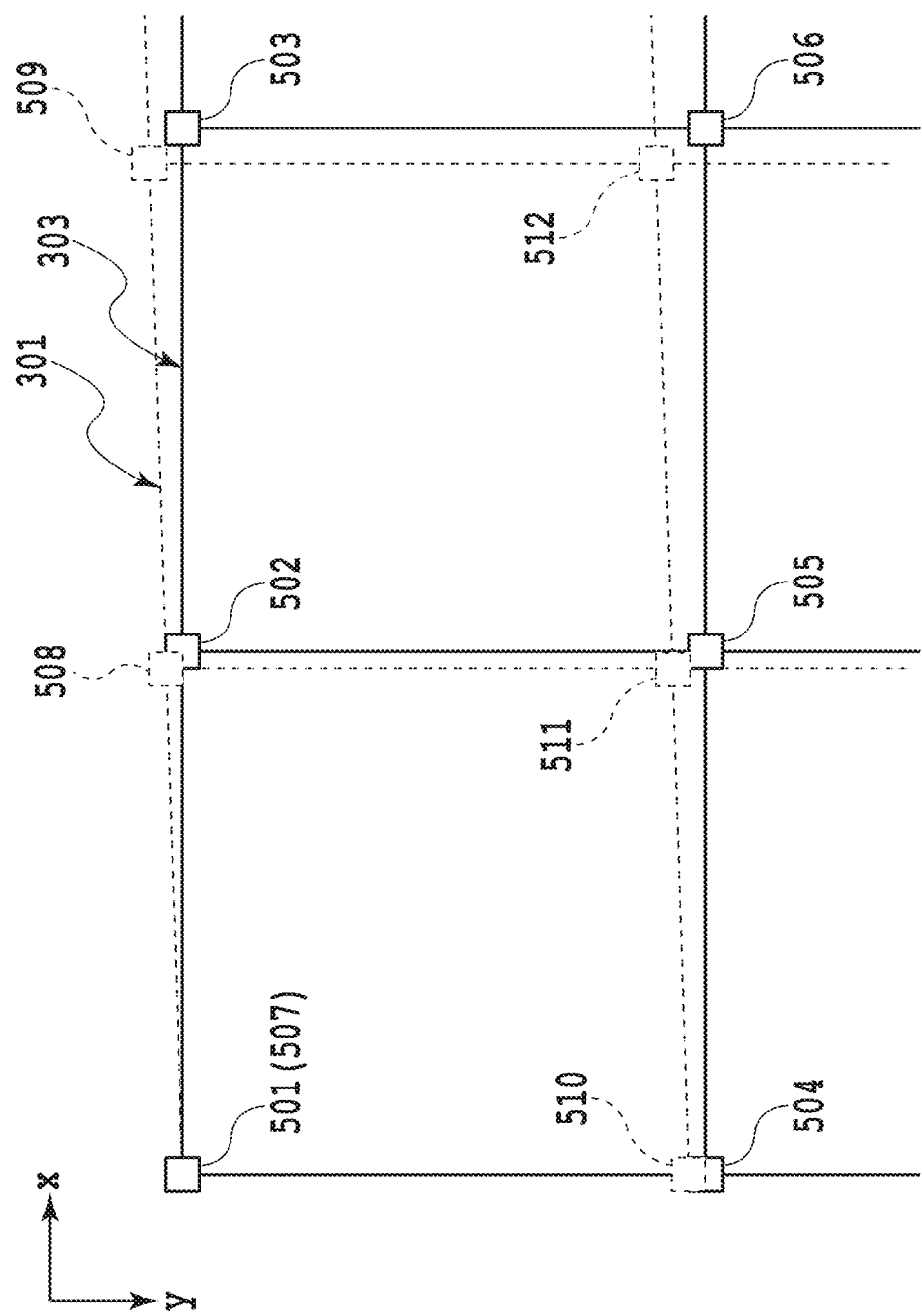
FIG. 10 shows the relative displacement between an inspection target image and a reference image.

FIG. 10 shows the relative displacement between the inspection target image 302 acquired in Step S102 and the reference image 301 acquired in Step S101. The drawing shows the inspection target image 302 and the work inspection image 303 extracted from the inspection target image 302 by the solid line. The regions in the reference image 301 corresponding to the respective work inspection images 303 are shown by the dotted line.

In FIG. 10, the coordinate 501 in the inspection target image 302 is at the same position as that of the coordinate 501 in the reference image 301. Thus, substantially no displacement exists between the work inspection image having the coordinate 501 as a base point and the work candidate image extracted based on the coordinate 501 as a base point. However, a slight displacement is caused between the work inspection image having the coordinate 502 as a base point and the work candidate image extracted based on the coordinate 508 as a base point. Within the range shown in FIG. 10, the largest displacement is caused between the work inspection image 303 having the coordinate 506 as a base point and a work candidate image extracted based on the coordinate 512 as a base point.

Figure 11:
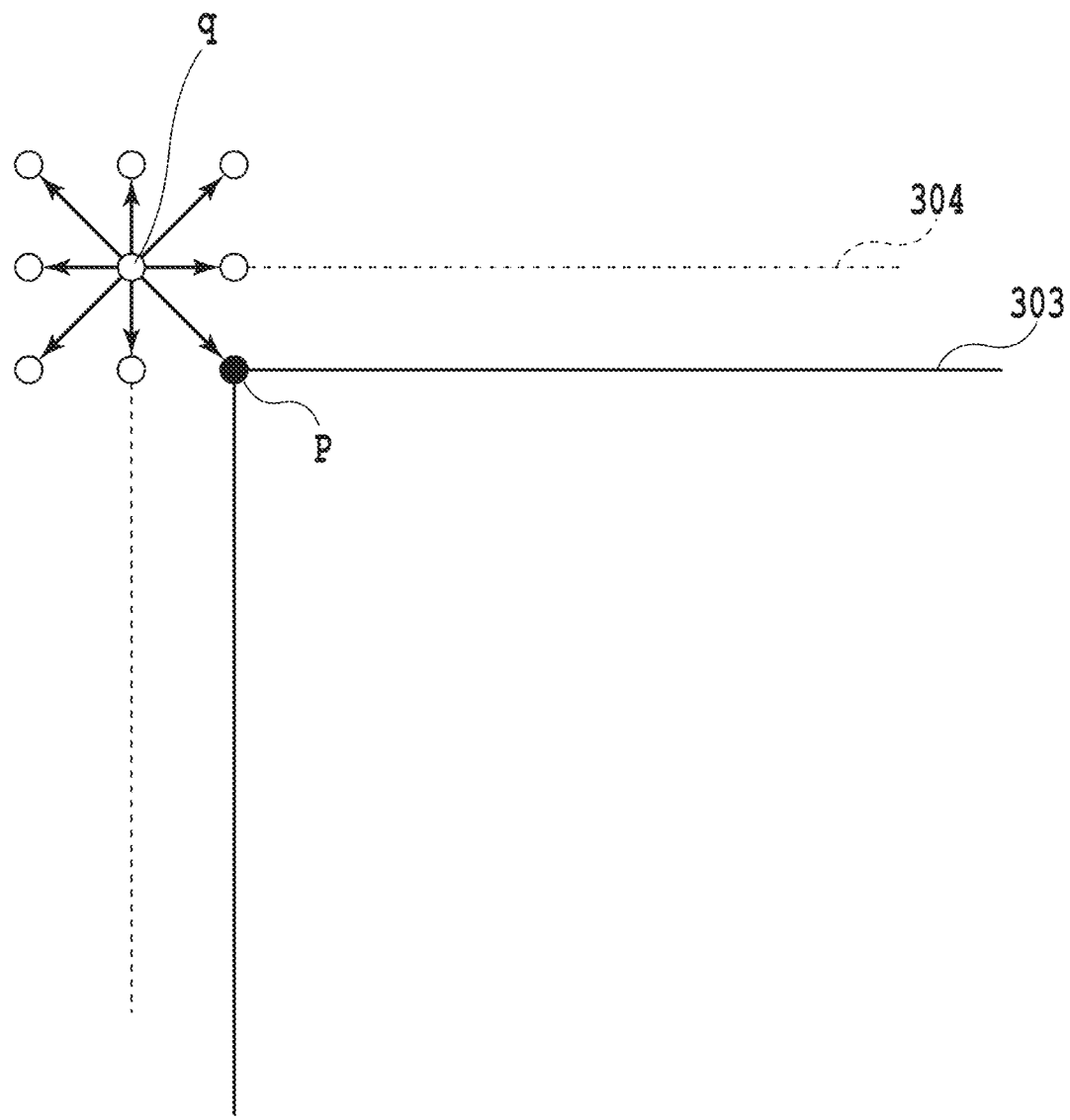
FIG. 11 shows a base point of a plurality of work candidate images extracted from a reference image.

FIG. 11 shows the respective base points of a plurality of work candidate images extracted from the reference image 301 in Step S105 in a case where such a displacement is being caused. The drawing shows a state where a displacement is caused between the base point p of the work inspection image 303 in the inspection target image 302 and the base point q of the work candidate image 304a in the reference image 301. Even in such a situation, by preparing the plurality of base points around the base point q as shown in the drawing, some base points thereamong are closer to the base point p of the work inspection image 303.

According to this embodiment, a plurality of regions translated based on the plurality of base points are extracted as work candidate images and are arranged to surround the work inspection image as described in FIG. 4, thereby generating the aligned image 401. By subjecting the image to the above-described similar region extraction processing, such an image is obtained that has the highest and uniform lightness at a position at which the work candidate image most similar to the work inspection image 303 (or corresponding to the work inspection image).

By performing the processings of S102 to S110 as described above on the respective work inspection images arranged in the predetermined direction as shown in FIG. 10, the respective work inspection images 303 can be caused to correspond to appropriate work reference images 305. The CPU 201 stores, with regard to each of the plurality of the work inspection images 303, the coordinate at which the work reference image 305 should be extracted from the reference image 301 to subsequently proceed to the second processing.

The following section will describe the second processing of this embodiment with reference to FIG. 2B. When this processing is started, the CPU 201 in Step S111 extracts the work inspection image 303 again from among the inspection target images 302 acquired in Step S102. The work inspection image 303 extracted at this stage has the same coordinate in the inspection target image 302 as that of the work inspection image 303 extracted in Step S104. However, the work inspection image extracted in this time has color information unlike with the work inspection image 303 extracted in Step S104.

In Step S112, the CPU 201 extracts the work reference image 305 corresponding to the work inspection image 303 extracted in Step S111. Specifically, the CPU 201 refers to the coordinate information stored in Step S109 of the first processing to extract, from the reference image 301, a region based on a coordinate corresponding to the work inspection image 303 extracted in Step S112 to set this as the work reference image 305.

Next, in Step S113, the CPU 201 subjects the work reference image 305 to a predetermined correction processing. This processing is a processing to provide the matching with the singular portion extraction processing subsequently carried out in Step S115. For example, when a color displacement is desired to be detected in the singular portion extraction processing, a lightness correction or color matching processing is performed to adjust the current color to have a color expected in the reference image. If an acceptable color difference range is defined in advance, then a plurality of correction images having the maximum color difference may be generated.

In Step S114, the CPU 201 causes the work inspection image 303 obtained in Step S111 to be aligned with the work reference image 305 corrected in Step S113 to thereby generate a for-inspection aligned image 307. The for-inspection aligned image 307 is generated by arranging the same work reference images 305 abutted to one work inspection image 303 in eight directions. In Step S115, the CPU 201 subjects the for-inspection aligned image 307 generated in Step S114 to the singular portion extraction processing using the processing of peripheral vision and involuntary eye movement during fixation. In a case where a plurality of correction images are generated in Step S113, the singular portion extraction processing of Step S114 and S115 also may be performed for the respective images. Alternatively, a plurality of correction images may be mixed to generate a for-inspection aligned image and the for-inspection aligned image can be subjected to the singular portion extraction processing.

Figure 12B:
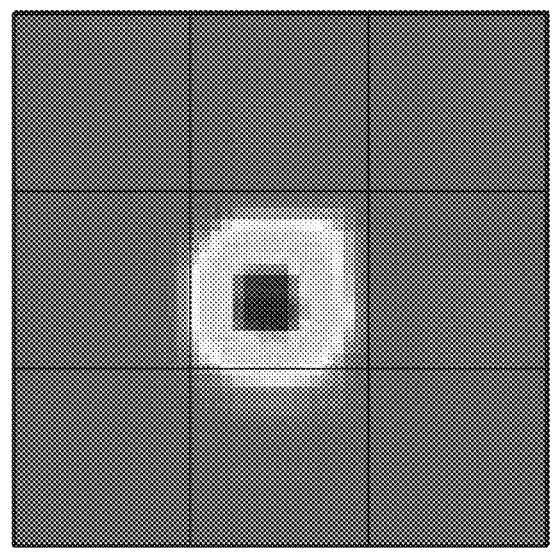
FIGS. 12A and 12B illustrate the result of performing the singular portion extraction processing.
Figure 12A:
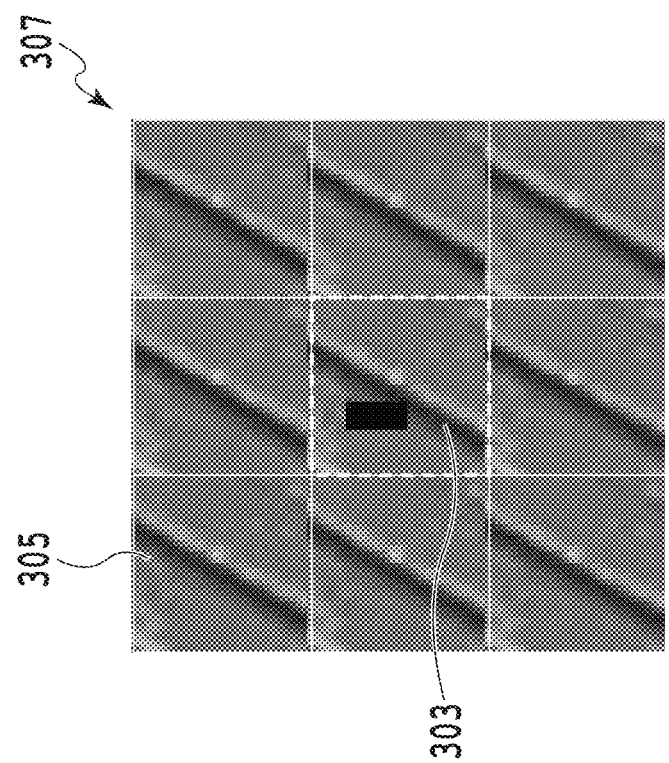

FIGS. 12A and 12B illustrate one example of the for-inspection aligned image 307 and the result of subjecting the image to the singular portion extraction processing. As shown in FIG. 12A, in the for-inspection aligned image 307, the work reference images 305 provided around the work inspection image 303 in the eight directions are an image that is obtained in the first processing as an image most similar to the work inspection image from among a plurality of work candidate images. In the drawing, a status is shown in which the work inspection image 303 includes therein a flaw 120.

In a case where the work inspection image 303 does not include therein a flaw for example, the work inspection image 303 is similar to the work reference image 305 and a uniform image is obtained after the singular portion extraction processing. However, if the work inspection image 303 includes therein the flaw 120 as shown in FIG. 12A, the similarity is reduced between the work inspection image 303 and the work reference image 305. Thus, the image obtained after the singular portion extraction processing is configured, as shown in FIG. 12B, so that a region corresponding to the work inspection image 303 includes a singular portion.

Returning to FIG. 2B, in a case where the singular portion extraction processing is completed in Step S115, then the CPU 201 proceeds to Step S116 to determine whether or not the inspection target image 302 includes a work inspection image not yet processed. In a case where the CPU 201 determines that the inspection target image 302 still includes a work inspection image not yet processed, then the processing returns to Step S111 to process the next work inspection image. In a case where the CPU 201 determines that the inspection target image 302 does not include a work inspection image not yet processed on the other hand, the CPU 201 determines that the singular portion extraction processing is completed for the entire area of the inspection target image 302 to proceed to Step S117.

In Step S117, CPU 201 performs an after-inspection processing based on the result of the singular portion extraction processing for a plurality of work inspection images. The details of the after-inspection processing are not particularly limited. For example, the singular portion can be displayed in a popped-up manner to attract the attention of the operator. In this case, the operator can confirm the singular portion based on the popped-up image to determine the cause of the singular portion. In a case, the singular portion is a defect portion, this can be repaired or can be excluded as a defective product. In Step S117, a further-detailed investigation also can be automatically carried out without requiring the intervention by the operator. For example, with regard to an object for which a singular portion is detected, the angle of view and the focus of the camera 101 can be changed so that the singular portion can be image-taken with a higher resolution. In this case, the resultant image can be pattern-matched with an image of a normal component prepared in advance so that the size or level of the flaw can be investigated. In a case where the object is a printed matter, it is also possible to investigate whether the singular portion is caused by paper dust, a defective printing head, or a defective conveying for example. The after-inspection processing of Step S117 also can stop the manufacture line depending on the determination result.

When the after-inspection processing to the inspection target image 302 is completed in Step S117, then the CPU 201 proceeds to Step S118 to determine whether or not there is an object to be inspected next. In a case where there is an object to be inspected next, then processing returns to Step S102 of FIG. 2A to perform the image-taking operation for the next object. In a case where it is determined that there no object to be inspected next on the other hand, this processing is completed.

According to this embodiment described above, a displacement between an inspection target image obtained by image-taking an object and a reference image can be adjusted to subsequently subject the inspection target image to the singular portion extraction processing. This can consequently reduce the influence by the displacement of the inspection target image on the reference image, thus realizing the accurate inspection to the inspection target image.

According to the embodiment described above, the first processing performs the processing of peripheral vision and involuntary eye movement during fixation on an image converted to monochrome brightness signals. The second processing subjects an image having a color signal to the processing of peripheral vision and involuntary eye movement during fixation. This is to exclude, in the first processing having a purpose of position adjustment, color information originally having high variation to carry out determination based on monochrome brightness signals faithfully reflecting the structure of the image. However, the present invention is not limited to such an embodiment. Thus, the first processing and the second processing may be carried out together with a processing using color information or the first processing and the second processing may be both determined based on the monochrome brightness information.

The work image size is not limited to a particular size. For example, in the case of the inspection system shown in FIG. 1, the carrying error of the object P is desirably considered. Specifically, if an error of 1 mm is caused at a maximum, then a 2 mm×2 mm region twice as big as the error is desirably set as a work inspection image or a work reference image. If a work image having a 10 mm×10 mm size much larger than the 1 mm×1 mm error is set, then the deteriorated uniformity is caused in the entire area of the processed image shown in FIG. 9B, which makes it difficult to select a work reference image.

Figure 13B:
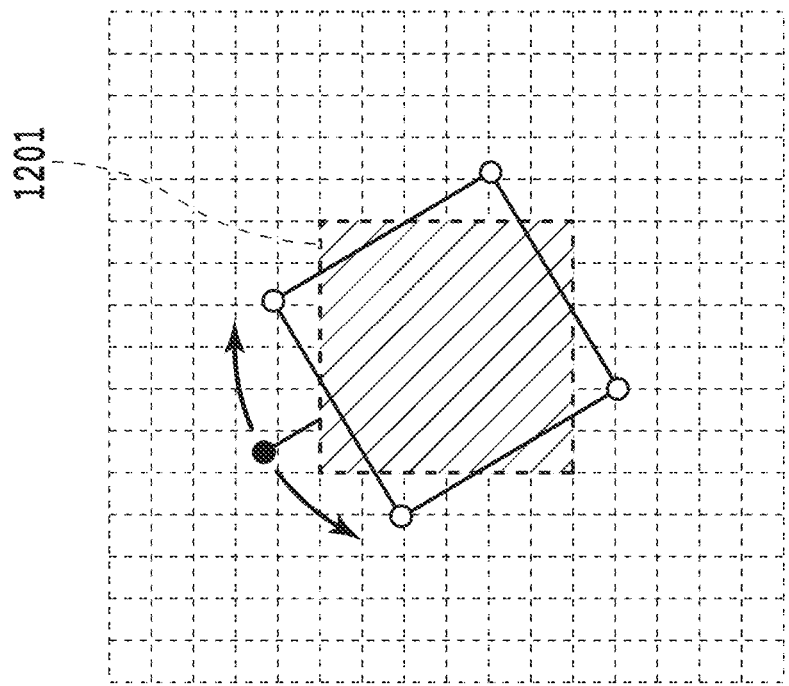
FIGS. 13A and 13B show another method to extract a work candidate image.
Figure 13A:
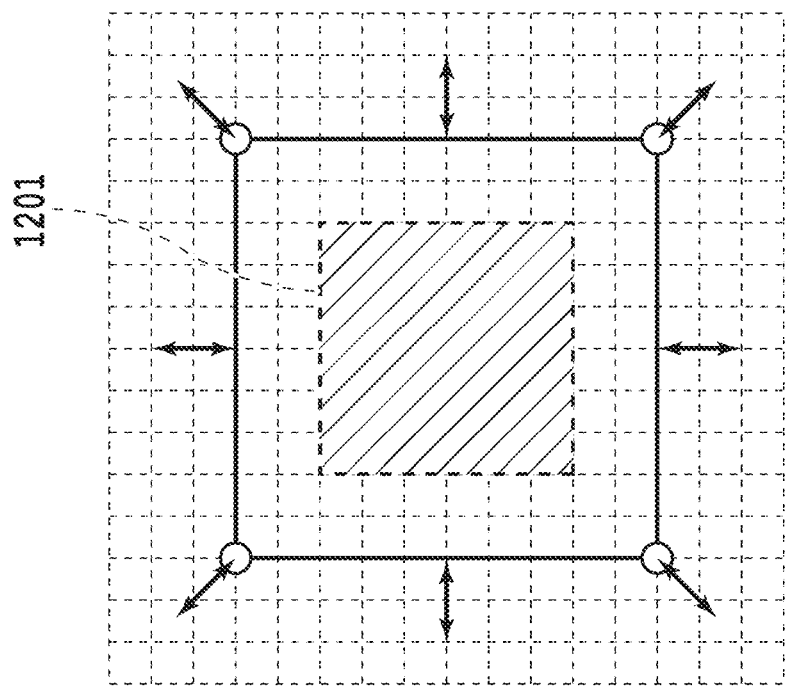

In the above section, an embodiment was used as shown in FIG. 11 in which a plurality of translated work candidate images were generated. However, a method of generating work candidate images is not limited to this. An inspection target image may include therein an error that cannot be solved by the translation due to the relative angle or relative distance between the camera and the object during the image taking or a change of the magnification for example. In such a case, a plurality of work candidate images can be extracted while using a different rate at which the reference image is enlarged or reduced as shown in FIG. 13A for example. Alternatively, a plurality of work candidate images may be extracted while using a different rotation angle to the reference image 301 as shown in FIG. 13B.

An embodiment has been described above in which a plurality of work candidate images are extracted for one work inspection image extracted from an inspection target image. However, in the first processing of the present invention, a plurality of work candidate images also can be extracted from the inspection target image with regard to one work reference image extracted from a reference image. Further, the above embodiment has been described in which all work inspection images are subjected to the first processing. However, the present invention is not limited to such an embodiment. For example, if the tendency in which a reference image is displaced from an inspection target image is clear as shown in FIG. 10, by setting the coordinate of the work reference image for some work inspection images, the coordinate of the work reference image corresponding to other work inspection images can be calculated using an interpolation equation. In any of the cases, a combination of images similar to each other can be selected as a work reference image and a work inspection image from the reference images and the inspection target images so as to have a one-to-one correspondence, thereby realizing the first processing of the present invention.

An embodiment has been described above in which a plurality of the work inspection images 303 are generated from one inspection target image 302 and a plurality of the work reference images 305 are generated from one reference image 301. However, this embodiment is not limited to such an embodiment. Another embodiment also may be used in which one work inspection image 303 is generated from one inspection target image 302 and one work reference image 305 is generated from one reference image 301. A plurality of the work inspection images 303 generated from one inspection target image 302 also may include mutually-superposed regions.

In the above description, an embodiment has been described in which a reference image is stored in the image processing apparatus 200 in advance. However, the present invention is not limited to such an embodiment. For example, an object for which it is confirmed that no flaw or image displacement exists therein is prepared in advance. A step of image-taking the object in order to use this as a reference image may be provided.

Further, in the above description, the similar region extraction processing of the first processing and the singular portion extraction processing of the second processing both used the processing of peripheral vision and involuntary eye movement during fixation. However, the second processing to extract a singular portion in the present invention does not always require the use of the processing of peripheral vision and involuntary eye movement during fixation. For example, in the singular portion extraction processing of Step S115, if it is possible to extract a difference between the reference image and the inspection target image, other inspection algorithms such as the pattern matching also can be used. Additionally, the position adjustment in the first processing does not always have to have an objective of the inspection as in the second processing. For example, by executing the first processing between frames of a moving image, a tracking movement of a point can be carried out clearly without a background slur. In any of the cases, the invention can effectively function so long as the situation requires the position adjustment of two images for a certain purpose.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-089942 filed Apr. 27, 2016, which is hereby incorporated by reference herein in its entirety.

What is claimed is:

1. An image processing apparatus, comprising one or more processors serving as:
   a generation unit configured to generate an aligned image by arranging a plurality of candidate images that are extracted from a reference image around a work inspection image that is extracted from an inspection target image;
   a processing unit configured to subject the aligned image to similar region extraction processing to express a similarity between regions in the aligned image,
   wherein the similar region extraction processing
   (1) divides the aligned image into a plurality of division regions each including a plurality of pixels, based on a first predetermined division size and a first phase which defines a dividing position in the aligned image,
   (2) for each of the plurality of division regions, (a) calculates an average value of the plurality of pixels and (b) quantizes the average value to obtain a quantization value,
   (3) performs the dividing, the calculating, and the obtaining multiple times by varying at least one of the first division size and the first phase, thereby obtaining multiple quantization values corresponding to each pixel included in the aligned image, and then
   (4) for each of the pixels included in the aligned image, adds the multiple quantization values corresponding to each pixel to obtain addition image data regarding the aligned image representing a result of adding quantization values;
   a determination unit configured to select a candidate image and to determine the selected candidate image as a work reference image based on the obtained addition image data regarding the aligned image; and
   a comparison unit configured to compare the work inspection image with the work reference image.

2. The image processing apparatus according to claim 1, wherein the generation unit subjects the work inspection image and the work reference image to at least one of monochrome conversion processing for converting color information to monochrome brightness signals and edge extraction processing for extracting an edge of an image to subsequently generate the aligned image.

3. The image processing apparatus according to claim 1, wherein the generation unit extracts a plurality of images existing at different positions in the reference image to set these images as the plurality of candidate images.

4. The image processing apparatus according to claim 1, wherein the generation unit expands or reduces an image extracted from the reference image at a different rate to thereby generate the plurality of candidate images.

5. The image processing apparatus according to claim 1, wherein the generation unit sets a plurality of images extracted while rotating the reference image at a different angle as the plurality of candidate images.

6. The image processing apparatus according to claim 1, wherein the comparison unit compares the work inspection image with the work reference image based on color information.

7. The image processing apparatus according to claim 1, wherein the comparison unit performs:

(1) generating a for-inspection aligned image by arranging the work reference images determined by the determination unit around the work inspection image;
(2) subjecting the for-inspection aligned image to singular portion extraction processing; and
(3) determining whether the work inspection image includes a singular portion or not based on the for-inspection aligned image after being subjected to the singular portion extraction processing, and
wherein the singular portion extraction processing:
(1) divides the for-inspection aligned image into a plurality of for-inspection division regions each including a plurality of pixels, based on a second predetermined division size and a second phase which defines a dividing position in the for-inspection aligned image,
(2) for each of the plurality of for-inspection division regions, (a) calculates an average value of the plurality of pixels and (b) quantizes the average value to obtain a quantization value,
(3) performs the dividing, the calculating, and the obtaining multiple times by varying at least one of the second division size and the second phase, thereby obtaining multiple quantization values corresponding to each pixel included in the for-inspection aligned image, and then
(4) for each of the pixels included in the for-inspection aligned image, adds the multiple quantization values corresponding to each pixel to obtain addition image data regarding the aligned image representing the result of adding quantization values.

8. The image processing apparatus according to claim 1, wherein the comparison unit compares the work inspection image with the work reference image using pattern matching method.

9. The image processing apparatus according to claim 1, wherein the determination unit determines, as the work reference image, a candidate image among the plurality of candidate images that is most similar to the work inspection image.

10. The image processing apparatus according to claim 1, wherein the one or more processors further serve as a reading control unit configured to control reading of an object to thereby acquire the inspection target image.

11. An image processing method, comprising:
   a generation step of generating an aligned image by arranging a plurality of candidate images that are extracted from a reference image around a work inspection image that is extracted from an inspection target image;
   a step of subjecting the aligned image to similar region extraction processing to express a similarity between regions in the aligned image,
   wherein the similar region extraction processing
   (1) divides the aligned image into a plurality of division regions each including a plurality of pixels, based on a first predetermined division size and a first phase which defines a dividing position in the aligned image,
   (2) for each of the plurality of division regions, (a) calculates an average value of the plurality of pixels and (b) quantizes the average value to obtain a quantization value,
   (3) performs the dividing, the calculating, and the obtaining multiple times by varying at least one of the first division size and the first phase, thereby obtaining multiple quantization values corresponding to each pixel included in the aligned image, and then (4) for each of the pixels included in the aligned image, adds the multiple quantization values corresponding to each pixel to obtain addition image data regarding the aligned image representing a result of adding quantization values, a determination step of selecting a candidate image and of determining the selected candidate image as a work reference image based on the obtained addition image data regarding the aligned image; and a comparison step of comparing the work inspection image with the work reference image.

12. The image processing method according to claim 11, wherein the generation step subjects the work inspection image and the work reference image to at least one of monochrome conversion processing for converting color information to monochrome brightness signals and edge extraction processing for extracting an edge of an image to subsequently generate the aligned image.

13. The image processing method according to claim 11, wherein the generation step extracts a plurality of images existing at different positions in the reference image to set these images as the plurality of candidate images.

14. The image processing method according to claim 11, wherein the generation step expands or reduces an image extracted from the reference image at a different rate to thereby generate the plurality of candidate images.

15. The image processing method according to claim 11, wherein the generation step sets a plurality of images extracted while rotating the reference image at a different angle as the plurality of candidate images.

16. The image processing method according to claim 11, wherein the comparison step compares the work inspection image with the work reference image based on color information.

17. The image processing method according to claim 11, wherein the comparison step performs:

(1) generating a for-inspection aligned image by arranging the work reference images determined by the determination step around the work inspection image;

(2) subjecting the for-inspection aligned image to singular portion extraction processing; and (3) determining whether the work inspection image includes a singular portion or not based on the for-inspection aligned image after being subjected to the singular portion extraction processing, and wherein the singular portion extraction processing:

(1) divides the for-inspection aligned image into a plurality of for-inspection division regions each including a plurality of pixels, based on a second predetermined division size and a second phase which defines a dividing position in the for-inspection aligned image, (2) for each of the plurality of for-inspection division regions, (a) calculates an average value of the plurality of pixels and (b) quantizes the average value to obtain a quantization value, (3) performs the dividing, the calculating, and the obtaining multiple times by varying at least one of the second division size and the second phase, thereby obtaining multiple quantization values corresponding to each pixel included in the for-inspection aligned image, and then (4) for each of the pixels included in the for-inspection aligned image, adds the multiple quantization values corresponding to each pixel.

18. The image processing method according to claim 11, wherein the determination step determines, as the work reference image, a candidate image among the plurality of candidate images that is most similar to the work inspection image.

19. The image processing method according to claim 11, further comprising reading step of reading an object to thereby acquire the inspection target image.

20. A non-transitory computer-readable storage medium which stores a program for causing an image processing method to be executed by a computer, the image processing method comprising:

a generation step of generating an aligned image by arranging a plurality of candidate images that are extracted from a reference image around a work inspection image extracted that is from an inspection target image;

a step of subjecting the aligned image to similar region extraction processing to represent a similarity between regions in the aligned image, wherein the similar region extraction processing (1) divides the aligned image into a plurality of division regions each including a plurality of pixels, based on a predetermined division size and a phase which defines a dividing position in the aligned image, (2) for each of the plurality of division regions, (a) calculates an average value of the plurality of pixels and (b) quantizes the average value to obtain a quantization value, (3) performs the dividing, the calculating, and the obtaining multiple times by varying at least one of the division size and the phase, thereby obtaining multiple quantization values corresponding to each pixel included in the aligned image, and then (4) for each of the pixels included in the aligned image, adds the multiple quantization values corresponding to each pixel to obtain addition image data regarding the aligned image representing a result of adding quantization values;

a determination step of selecting a candidate image and of determining it as a work reference image based on the obtained addition image data regarding the aligned image; and a comparison step of comparing the work inspection image with the work reference image.

* * * * *